United States Patent
Zhang et al.

(10) Patent No.: US 9,854,384 B2
(45) Date of Patent: Dec. 26, 2017

(54) PROXIMITY BASED CONTENT SHARING

(71) Applicant: Dropbox, Inc., San Francisco, CA (US)

(72) Inventors: David Zhang, Mountain View, CA (US); Huy Nguyen, Foster City, CA (US)

(73) Assignee: Dropbox, Inc., San Francisco, CA (US)

( * ) Notice: Subject to any disclaimer, the term of this patent is extended or adjusted under 35 U.S.C. 154(b) by 193 days.

(21) Appl. No.: 14/530,492

(22) Filed: Oct. 31, 2014

(65) Prior Publication Data
US 2016/0127855 A1    May 5, 2016

(51) Int. Cl.
| H04B 7/00 | (2006.01) |
| H04W 4/00 | (2009.01) |
| H04H 20/61 | (2008.01) |
| H04H 60/15 | (2008.01) |
| H04W 12/04 | (2009.01) |
| H04W 12/08 | (2009.01) |
| H04W 12/06 | (2009.01) |
| H04L 29/06 | (2006.01) |

(52) U.S. Cl.
CPC ............ H04W 4/008 (2013.01); H04H 20/61 (2013.01); H04H 60/15 (2013.01); H04W 12/04 (2013.01); H04W 12/08 (2013.01); H04L 63/067 (2013.01); H04W 12/06 (2013.01)

(58) Field of Classification Search
CPC ........ H04W 24/02; H04W 4/24; H04W 4/26; H04W 88/06; H04W 8/18; H04W 4/14; H04W 4/22; H04W 88/02; H04W 12/04; H04W 12/06; H04W 12/08; H04W 4/003; H04W 4/008; H04W 4/02; H04W 4/10; H04W 4/20; H04W 76/005; H04W 8/26; H04H 20/61
USPC ....................................... 455/41.2
See application file for complete search history.

(56) References Cited

U.S. PATENT DOCUMENTS

| 8,856,045 | B1 * | 10/2014 | Patel ................. G06Q 20/3823 705/64 |
| 2007/0033637 | A1 * | 2/2007 | Yami .................. H04L 63/0428 726/2 |
| 2013/0013698 | A1 | 1/2013 | Relyea et al. |
| 2013/0104221 | A1 * | 4/2013 | Low ....................... H04W 4/08 726/9 |
| 2013/0219076 | A1 | 8/2013 | Islam et al. |
| 2014/0181198 | A1 * | 6/2014 | Motes .................... H04L 29/06 709/204 |

(Continued)

*Primary Examiner* — Ajibola Akinyemi
(74) *Attorney, Agent, or Firm* — Fenwick & West LLP (57) ABSTRACT

A sharing user of a content management system can request to share a content item in his namespace. When such a request is made, the sharing user's client device broadcasts a notification that can be received by devices that are within a limited broadcast range of the sharing client device. A receiving user's client device that is within the limited broadcast range of the sharing client device receives the broadcasted notification. Based on the notification, the receiving client device obtains a token from the sharing client device that identifies the content item being shared by the sharing user. At the request of the receiving user, the receiving client device transmits the token to the content management system and requests that the content management system add the shared content item to the receiving user's namespace with the system. The receiving user can then access the item from his namespace.

15 Claims, 7 Drawing Sheets

(56) References Cited

U.S. PATENT DOCUMENTS

| | | |
|---|---|---|
| 2014/0222560 A1 | 8/2014 | Kota |
| 2014/0229544 A1 | 8/2014 | Evans et al. |
| 2015/0154484 A1* | 6/2015 | Iwasaki .............. G06K 15/4095 358/1.14 |

* cited by examiner

PROXIMITY BASED CONTENT SHARING

BACKGROUND

1. Field

The described embodiments pertain in general to content management systems, and more specifically to sharing content via a content management system.

2. Description of the Related Art

On a daily basis people share digital content with each other. For example, a person at a picnic with friends may take a group picture and one or more of those friends may want a copy of the picture. To share content, a user typically uses a messaging service, such as an email service or an instant messaging service. However, with messaging services, the user has to identify each person that is to receive the content by, for example, selecting them from a list of contacts, by providing their contact information, or by selecting the person's client device from a list of available devices. This can be a cumbersome and time consuming process if the content is to be shared with a large number of users or if the sharing user does not have the contact information of a user that wants the content. Further, even once the various receiving devices are identified, the user's client device must transmit the content item to each of the devices, which can be time consuming if the content item is large, such as a video recording.

SUMMARY

A content management system maintains a namespace for each user that has an account with the system. A user uses his namespace to store content items (e.g., documents, pictures, videos) which can be accessed by the user from multiple client devices. Further, a user (a sharing user) of the content management system can request to share one or more content items in his namespace with users that are located in the vicinity of the sharing user. When such a request is made, the sharing user's client device (sharing client device) broadcasts a notification that can be received by client devices that are within a limited broadcast range of the sharing client device. In one embodiment, the notification is broadcast according to a short-range communication protocol (e.g., Bluetooth Low Energy) and the range of the broadcast is limited by the protocol.

A user (receiving user) that is within the broadcast range of the sharing client device and wishes to obtain the shared content items enables their client device (receiving client device) to scan for broadcasted notifications. The receiving client device receives the notification from the sharing user. Based on the notification, the receiving device obtains a token from the sharing client device that identifies the one or more content items being shared by the sharing user. In one embodiment, to obtain the token, the receiving client device uses the notification to establish a short-range connection with the sharing client device. Through the short-range connection the receiving client device receives the token from the sharing client device. In another embodiment, the broadcasted notification includes the token.

The receiving client device transmits the token to the content management system and requests that the content management system add the shared content items to the receiving user's namespace with the system. The content management system processes the request and adds the shared content items to the receiving user's namespace. The receiving user is then able to access the items from his namespace on the content management system. Since the sharing device need only transmit the token, the transfer is extremely fast, and is essentially independent of the size or number of content items being shared; for example a 10 Gb video file can be shared as quickly as a single 200 kb document; similarly a folder containing 200 content items can be shared as quickly as a single file. In both of these cases, a single token with a relatively small size (e.g., less than 10 Kb) can be used to represent the content item(s) being shared.

Features and advantages described in this summary and the following detailed description are not all-inclusive. Many additional features and advantages will be apparent to one of ordinary skill in the art in view of the drawings, specification, and claims hereof.

The figures depict various embodiments for purposes of illustration only. One skilled in the art will readily recognize from the following description that alternative embodiments of the structures and methods illustrated herein may be employed without departing from the principles described herein. Unless stated otherwise, each embodiment, including any individual feature, attribute, method, operation, elements, part, process, step, or aspect thereof, should be understood to be combinable with any other embodiment, in any order, combination or permutation.

DETAILED DESCRIPTION

The figures described herein use like reference numerals to identify like elements. A reference numeral without a following letter, such as "104," refers to any or all of the elements in the figures bearing that reference numeral. A letter after a reference numeral, such as "104A," indicates that the text refers specifically to the element having that particular reference numeral.

Figure 1A:
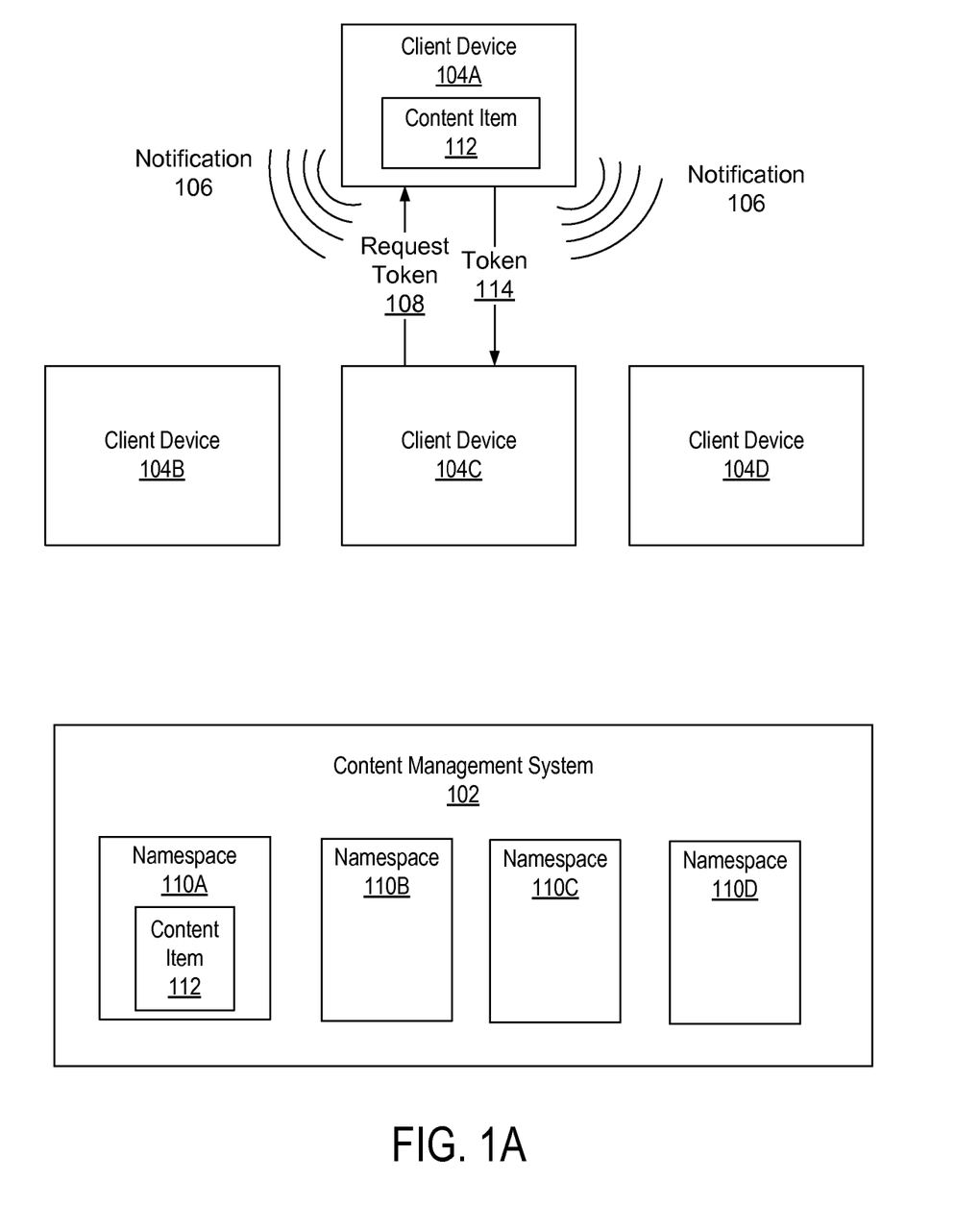
FIGS. 1A and 1B illustrate an overall process flow for sharing a content item through a content management system according to one embodiment.
Figure 1B:
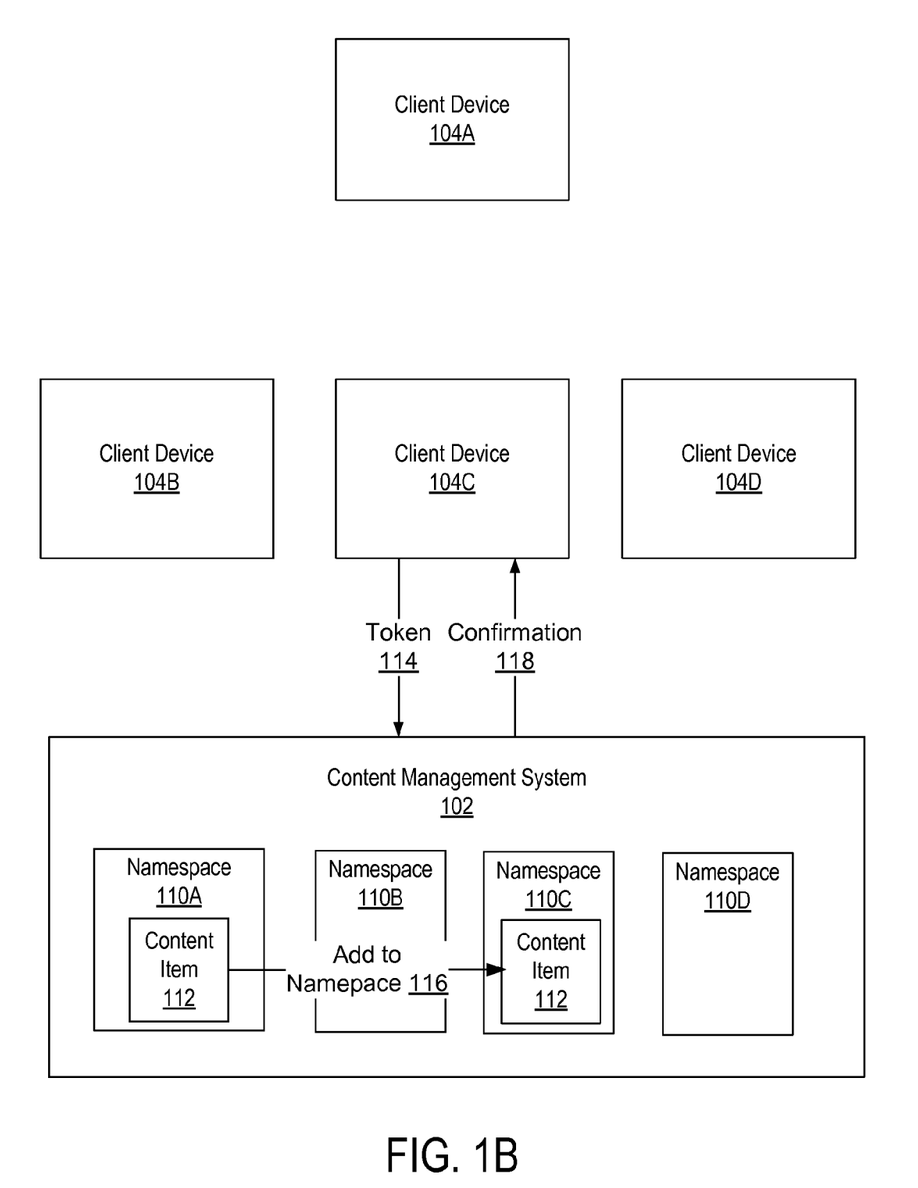

FIGS. 1A and 1B illustrate an overall process flow for sharing a content item through a content management system 102 according to one embodiment. FIGS. 1A and 1B illustrate content management system 102 and four client devices 104A, 104B, 104C, and 104D. In this example, each client device 104 is operated by a different user and each user has an account with content management system 102. Content management system 102 maintains a namespace 110 for each user of the devices 104. Namespace 110A is maintained for the user of client device 104A, namespace 110B is maintained for the user of client device 104B, and so forth. A namespace 110 is a root directory of a file system directory tree that includes one or more content items. Each client device 104 has access to the content items in its namespace 110.

As can be seen in FIG. 1A, namespace 110A includes content item 112 uploaded to content management system 102 by the user of client device 104A. The user (sharing user) of client device 104A requests to share content item 112 with users in the vicinity, and in response to the request, the client device 104A creates notification 106 and broadcasts notification 106 to initiate the sharing. In one embodiment, the notification includes a maximum of 31 octets and is prepared according to the advertising and scan response data format as described in Bluetooth Specification Version 4.0, which is incorporate by reference herein in its entirety. In one embodiment, the notification includes a unique identifier assigned to the client device 104A (e.g., a universally unique identifier (UUID).

Notification 106 is broadcast according to a short-range communication protocol, where communications transmitted using the protocol travel a short distance. For example, the notification can be broadcast using Bluetooth (e.g., Bluetooth low energy). Hence, the broadcast has a limited range and notification 106 can be received by devices 104 that are within the broadcast range of client device 104A (and otherwise enabled to receive the broadcast). In this example, client devices 104B, 104C, and 104D are within the broadcast range of notification 106. The user (receiving user) of client device 104C enables device 104C to scan for broadcasted notifications (e.g., Bluetooth is enabled) and as a result receives notification 106.

As an example, content item 112 may be a picture that the sharing user took at a party and uploaded to content management system 102 for storage in his namespace 110A. While still at the party, the sharing user can select to share the picture. The sharing user notifies users at the party that he is sharing the picture. If the receiving user of client device 104C wishes to receive the shared image, the receiving user enables device 104C to scan for notifications. The users of client device 104B and 104D do not enable scanning on their devices 104 because they are not be interested in receiving the shared picture.

Responsive to receiving the notification 106, client device 104C establishes a short-range connection (e.g., Bluetooth connection, NFC connection) with client device 104A using the identifier included in the notification. The sharing user may control with whom content item 112 is shared by associating a password with the sharing and providing the password to those users that the sharing user wishes to receive content item 112. In one embodiment, if the sharing user has set a password for the sharing of content item 112, client device 104A only establishes the short-range connection with client device 104C if the receiving user provides the correct password.

After the short-range connection is established between client device 104A and client device 104C, client device 104C transmits a request 108 for a token associated with shared content item 112. Client device 104A transmits the token 114 to client device 104C. Token 114 includes an identifier of content item 112, which includes the full namespace identification. The token may include additional information, such as an identifier of the sharing user (e.g., name of the sharing user), a name associated with the content item, a description of the content item, and an indication of the number of content items being shared.

In another embodiment, once the connection is established, sharing client device 104A automatically transmits the token 114 to the client device 104C, without requiring the client device 104C to request 108 the token, since the establishment of the connection between the two client devices 104 sufficiently indicates the receiving user's intent to receive the shared content item.

In another embodiment, notification 106 broadcasted by client device 104A includes token 114. Hence, in this embodiment client device 104C does not need to establish a short-range connection with client device 104A for receiving token 14 since the broadcasted notification already includes the token. In one embodiment, if the sharing user has set a password for the sharing of content item 112, token 114 is encrypted. Client device 104C is able to decrypt the token when the receiving user provides the password.

As continued in FIG. 1B, client device 104C transmits token 114 to content management system 102 with a request that the content item 112 be added to the receiving user's namespace 110C. Content management system 102 adds 116 content item 112 to the receiving user's namespace 110C based on the request. Content management system 102 transmits a confirmation message 118 to client device 104C indicating that content item 112 been added to namespace 110C. The receiving user can then access content item from namespace 110C using client device 104C or another client device 104.

Here, since the sharing is initiated through a broadcast, the sharing user is able to share content item 112 without having to identify or provide contact information for the one or more users that are to receive item 112. Nor does the sharing user have to transmit from the client device 104 the content item 112 itself, but need only transmit the token 114. This saves both time (since the token 114 is typically significantly smaller in size then the content item 112), and in some cases, battery power of the client devices 104. Additionally, by using content management system 102 for the sharing, content items can be shared across client device platforms. For example, the sharing user is able to share content item 112 with the receiving user even if client device 104A is running a different operating system than client device 104C.

Further, the sharing user is able to share content item 112 without client device 104 having to have a local copy of the item. Additionally, client device 104C does not have to download item 112 to complete the sharing and have control over shared item 112. As an example, assume a sharing user uploads a movie from his desktop to content management system 102 for storage under the sharing user's namespace 110. The next day the sharing user is in the vicinity of another user who also has an account with content management system 102 and thus a corresponding namespace 110. The sharing user wishes to share the movie with this other user. The sharing user does not have the movie stored on his mobile phone (client device 104) and the other user's mobile phone does not have sufficient memory space to store the movie. The sharing user can still share the movie with the other user using the processes described above, resulting in the movie being added to the other user's namespace 110 with system 102. When the other user gets home, the other user can download the movie onto his desktop from his namespace 110 and watch the movie. In another, example, the desktop may include an application that automatically downloads items added to the other user's namespace. Hence, in this example when the movie is added to the other user's namespace, the desktop computer automatically downloads the movie and the user can watch it when he gets home.

Figure 2:
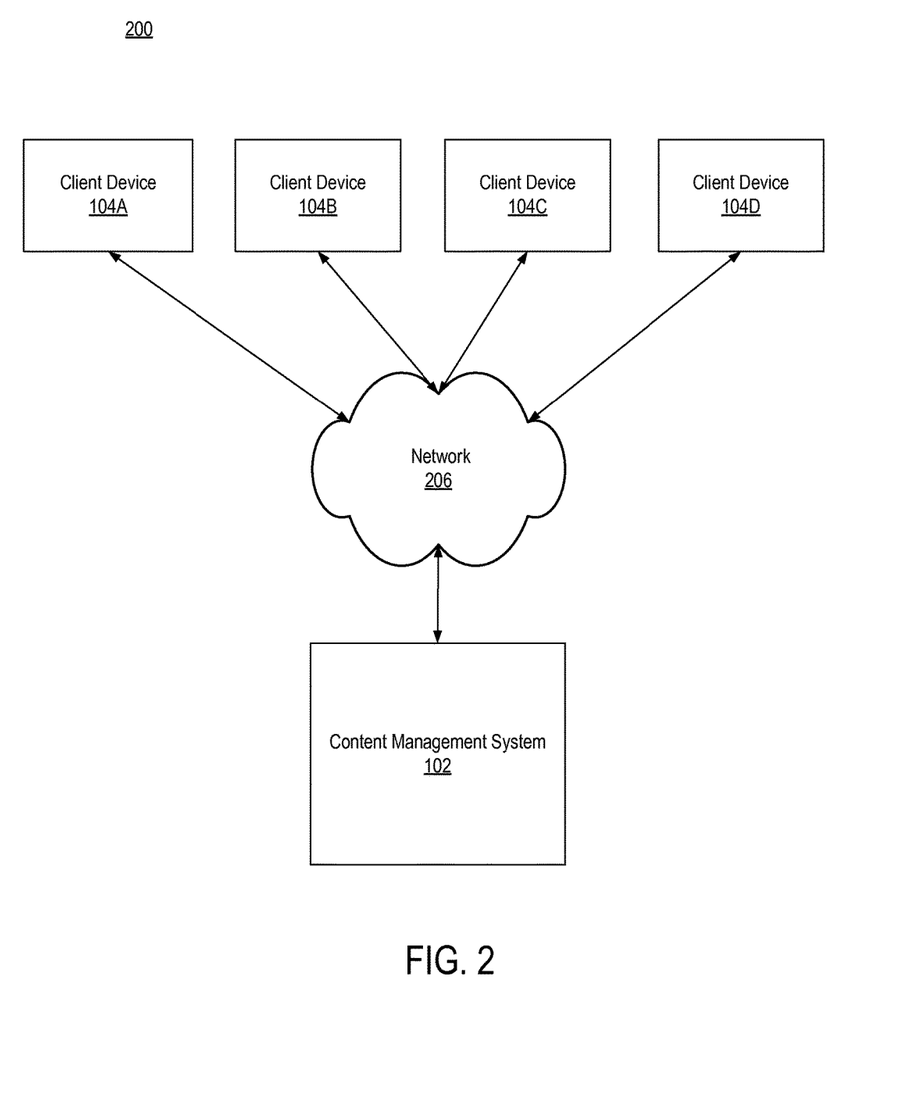
FIG. 2 is a block diagram of a content management system environment according to one embodiment.

FIG. 2 is a block diagram of content management system environment 200 according to one embodiment. Environment 200 includes content management system 102 and client devices 104A, 104B, 104C, and 104D connected to a network 206. Although illustrated environment 200 only includes four client devices 104, other embodiments include additional client devices 104 (e.g., millions of client devices 104).

Network 206 enables communication among the entities connected to it. In one embodiment, network 206 is the Internet and uses standard communications technologies and/or protocols. Thus, network 206 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, etc. Similarly, the networking protocols used on network 206 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 206 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Content management system 102 maintains a namespace for each user that has an account with system 102. As described above, a namespace is a root directory of a file system directory tree that includes one or more content items. A user can provide content items to content management system 102 for storage under the user's namespace. Further, a user can access and share content items stored by content management system 102 under the user's namespace. A content item may include one or more of the following: digital data, audio, video, text, images, pictures, graphics, code, documents, and folders.

Figure 3:
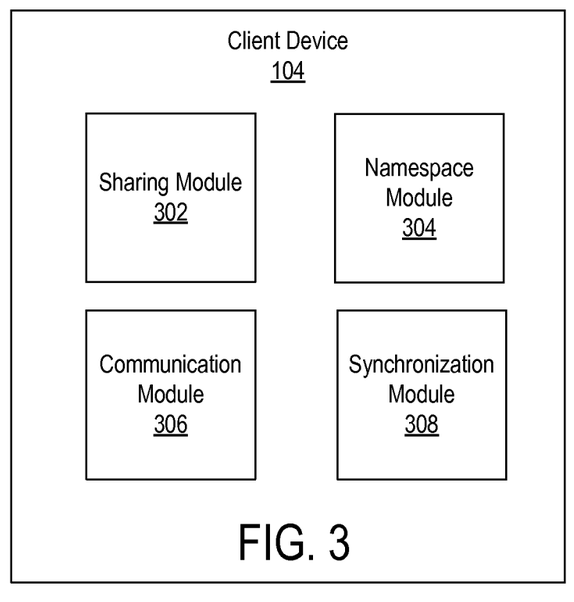
FIG. 3 is a block diagram illustrating modules operating within a client device according to one embodiment.

A client device 104 is a computer system used by users to communicate with other client devices 104 and with content management system 102 via network 206. Client device 104 may be, for example, a mobile phone, a tablet, a personal digital assistant (PDA), or a personal computer. As illustrated in FIG. 3, client device 104 includes sharing module 302, namespace module 304, communication module 306, and synchronization module 308. Those of skill in the art will recognize that other embodiments of client device 104 can have different and/or other components than the ones described here, and that the functionalities can be distributed among the components in a different manner.

Sharing module 302 processes requests to share content items stored in a user's namespace with content management system 102. Sharing module 302 presents a user interface on client device 104 that shows the content items included in the user's namespace. Sharing module 302 obtains information as to the content items included in the namespace from content management system 102.

The user can request, via the sharing module 302, to share one or more of the content items with users in the vicinity of the client device 104. If the user requests to share a content item with nearby users, sharing module 302 notifies content management system 102 that the content item is being shared. Additionally, sharing module 302 presents a message that enables the user to associate a password with the sharing of the content item. If the user associates a password with the sharing of the content item, sharing module 302 stores the password. A user that wishes to receive the shared content item will be required to provide the password. The sharing user can share the password verbally with users that he wishes receive the content item. For example, if the user is at dinner and wishes to share a content item with people at dinner, the user can verbally notify the people at dinner that he is sharing the item and provide the password. The sharing user can also share the password via a messaging service, such as an email or instant messaging service. In one embodiment, the sharing module 302 sends the password to the content management system 102. In this embodiment, if another user requests to add the shared content item to their namespace, they will be required to provide the password to the content management system 102.

Sharing module 302 creates a token associated with the sharing of the content item. The token includes a unique identifier of the content item being shared and allows users to obtain the shared content item from content management system 102. The token is shared as described below.

To share the content item with nearby devices 104, sharing module 302 creates a notification and requests that communication module 306 broadcast the notification so that it can be received by devices 104 within range of the broadcast. If a password is associated with the sharing of the content item, sharing module 302 encrypts the notification so that it can only be decrypted by a device 104 if the password is provided. In another embodiment, if a password is associated with the sharing of the content item, the token is encrypted by sharing module 302 so that it can only be decrypted by a device 104 if the password is provided.

The notification may include an identifier of client device 104. When another client device 104 receives the notification and requests the token associated with the shared content item, sharing module 302 instructs communication module 306 to provide the token to requesting device 104. In one embodiment, sharing module 302 only shares the token with requesting devices 104 for a set period of time (e.g., 10 minutes). Hence, after the set period of time sharing module 302 will not provide the token to client devices 104 which will prevent their respective users from obtaining the shared content item. In one embodiment, the period of time is set by the user of client device 104 when requesting to share the content item.

In another embodiment, sharing module 302 includes the token with the notification broadcast by communication module 306. In this embodiment, since the notification includes the token, sharing module 302 does not receive requests for tokens.

Namespace module 304 processes requests related to the namespace maintained by the content management system 102 for the user. The requests include adding a content item to the namespace and accessing a content item in the namespace. If the user requests that a content item stored on client device 104 be added to the namespace with content management system 102, namespace module 304 transmits the content item to content management system 102 and requests that the item be stored by system 102 under the user's namespace. Namespace module 304 receives a confirmation message from content management system 102 indicating that the item has been uploaded and stored. Namespace module 304 presents the confirmation message to the user.

Namespace module 304 also processes requests to add shared content items to the namespace. When a broadcast notification associated with the sharing of a content item is received by client device 104, namespace module 304 determines whether the notification includes a token associated with the shared content item. If the notification does not include a token, namespace module 304 instructs communication module 306 to request the token from the device 104 that broadcast the notification.

Once the token is identified (included in the notification or received after requesting it), namespace module 304 presents an interface to the user indicating the content item being shared as specified by the token. For example, the namespace module 304 can present the name of the shared content item. In one embodiment, through the interface the user can request to download a copy of the shared content item or add the shared content item to the user's namespace.

If the user requests to download a copy of the shared content item, namespace module 304 transmits the token to content management system 102 and requests the content item. Namespace module 304 notifies the user when the shared content item is received/downloaded from content management system 102.

If the user request that the shared content item be added to the user's namespace, namespace module 304 transmits the token to content management system 102 and requests that the shared item be added to the user's namespace. Namespace module 304 receives a confirmation message from content management system 102 indicating that the shared item has been added to the namespace. Namespace module 304 presents the confirmation message to the user.

When the user requests access to access a content item included in the user's namespace with content management system 102, content management system 102 transmits a request to access the content item. The request includes an identifier associated with the content item. A copy of the content item is received from content management system 102 based on the request. Namespace module 304 notifies the user when the shared content item is received from content management system 102.

In one embodiment, if the user modifies the copy of the content item and requests to save the changes in the user's namespace, namespace module 304 determines the modifications made to the content item. Namespace module 304 transmits information to content management system 102 indicating the modifications made to the content item and requests that the content in the user's namespace be modified in the same way.

Communication module 306 handles communications with other client devices 104 related to sharing of content items. If sharing module 302 requests that a notification be broadcast in association with the sharing of a content item, communication module 306 broadcasts the notification according to a short-range communication protocol. Communications transmitted using the short-range communication protocol travel a short distance (have a limited range). Hence, the notification can only be received by other devices 104 within the broadcast range and that are enabled to receive short-range communication protocol messages. In one embodiment, communication module 306 periodically broadcasts the notification for a set period of time (e.g., 30 seconds). In one embodiment, communication module 306 broadcasts the notification using Bluetooth (e.g., Bluetooth low energy). In another embodiment, communication module 306 broadcasts the notification using Near-Field Communication. In another embodiment, the notification is broadcast on a local area network (LAN), such as a wireless LAN using the IEEE 802.11 standard.

Based on the broadcast of the notification, if another client device 104 requests to establish a short-range connection with client device 104, communication module 306 establishes the short-range connection with the other device 104. If sharing module 302 requests that a token be provided to the other device 104, communication module 306 provides the token to the other device 104 through the short-range connection.

If the user of client device 104 requests to enable scanning for broadcasted notifications, communication module 306 scans for broadcasted notifications for a set period of time. If a notification is identified, communication module 306 determines whether the notification has been encrypted using a password. If the notification has been encrypted, communication module 306 presents an interface to the user requesting a password. If the user provides the correct password, communication module 306 is able to decrypt the notification. If the user is not able to provide the correct password, an error message is presented to the user. If the notification is properly decrypted (or if the notification was not encrypted), communication module 306 provides an indication to namespace module 304 of the receipt of the notification. In another embodiment, communication module 306 is able to receive broadcasted notifications without the user having to enable scanning for notifications.

If namespace module 304 requests a token from the client device 104 that broadcasted the notification, communication module 306 establishes a short-range connection with broadcasting client device 104 using the notification. Communication module 306 requests the token from broadcasting client device 104 via the short-range connection. The token is received via the short-range connection. If the token has been encrypted, communication module 306 presents an interface to the user requesting a password. If the user provides the correct password, communication module 306 is able to decrypt the token. If the user is not able to provide the correct password, an error message is presented to the user. If the token is properly decrypted (or if the token was not encrypted), communication module 306 provides the token to namespace module 304.

Synchronization module 308 synchronizes a local copy of the namespace with the namespace maintained by content management system 102 for the user. At the request of the user, synchronization module 308 stores on client device 104 a local copy of the namespace maintained by content management system 102 for the user. The local copy of the namespace is synchronized with the namespace maintained by content management system 102 for the user. Hence, the two namespaces are organized the same, the namespaces include the same content items, and the content items are synchronized.

In one embodiment, if the namespace stored by content management system 102 for the user is modified (e.g., a content item is added to the namespace or a content item in the namespace is modified), synchronization module 308 receives information from content management system 102 indicating the modifications made to the namespace. Synchronization module 308 modifies the local copy of the namespace based on the received information so that it is the same as the system's namespace. Similarly, if the local copy of the namespace is modified (e.g., a content item in the local copy is modified or a content item is added to the local copy), synchronization module 308 transmits information to content management system 102 indicating the modifications made to the local copy. Content management system 102 modifies the stored namespace of the user based on the transmitted information. Additional description of namespace synchronization is included in U.S. Pat. No. 8,825,597, incorporated by reference herein in its entirety.

Figure 4:
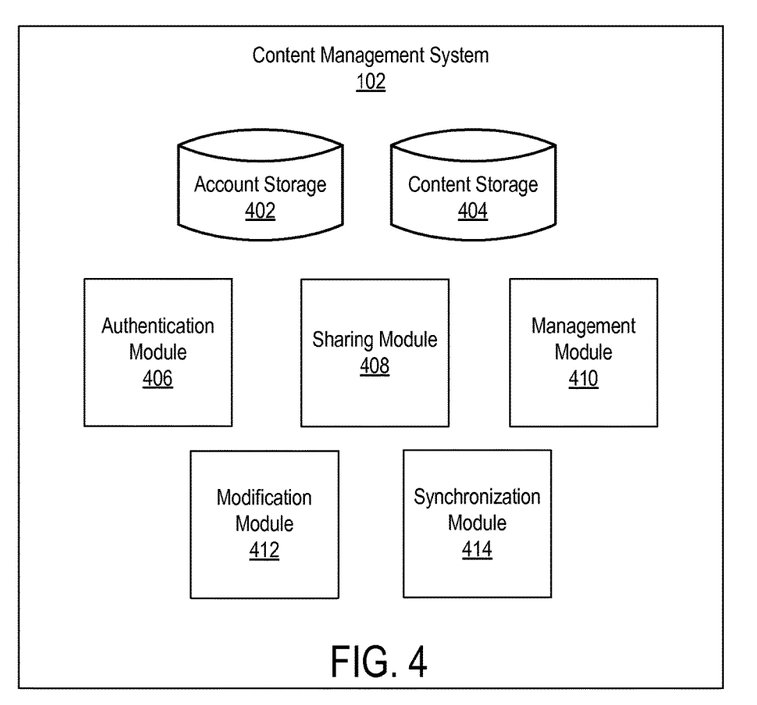
FIG. 4 is a block diagram illustrating modules operating within a content management system according to one embodiment.

FIG. 4 is a block diagram illustrating modules operating within content management system 102 according to one embodiment. Content management system 102 includes account storage 402, content storage 404, authentication module 406, sharing module 408, management module 410, modification module 412, and synchronization module 414. Those of skill in the art will recognize that other embodiments of content management system 102 can have different and/or other components than the ones described here, and that the functionalities can be distributed among the components in a different manner.

Account storage 402 stores account information for each user that has created an account with content management system 102. The account information stored in account storage 402 for a user may include personal information, such as name of the user, a communication identifier of the user (e.g., an email-address), authentication information (e.g., a username and password) used to authenticate the user, contact information for contacting the user, and payment information (e.g., a credit card number or a bank account number) for charging the user accrued fees. The account information may also include information as to the type of account the user has with system 102 (e.g., free or paid account), maximum storage space allocated to the user, and amount of storage space being used by the user.

Content storage 404 stores content items provided by users for storage. In one embodiment, for each user that has an account with content management system 102, content storage 404 includes a namespace that stores content items uploaded by the user to system 102 for storage and content items shared with the user. The content items included in a namespace may be organized into folders as directed by a user. A folder may also include one or more folders within it, which are referred to as sub-folders.

Authentication module 406 authenticates users having an account with content management system 102. When a user requests to perform certain actions, the authentication module 406 authenticates that the user has an account with content management system 102. For example, a user may be authenticated when the user requests to add a content item to the user's namespace, requests to access a content item from the user's namespace, requests to modify a content item in the user's namespace, requests to share a content item, or requests to access account information of the user stored in account storage 402.

In one embodiment, to authenticate a user, authentication module 406 checks whether the user's client device 104 includes a cookie with authentication information of the user. The authentication information may be, for example, an identifier of the user (e.g., email address or username selected by the user) and a password. If client device 104 includes a cookie, authentication module 406 verifies that the authentication information included in the cookie matches the information stored in account storage 402 for the user. If client device 104 does not include a cookie, authentication module 406 instructs client device 104 to present an interface to user through which the user can provide authentication information. When the user provides the authentication information via the interface, the authentication module 406 verifies the authentication information. In other embodiments, other methods may be used to authenticate a user, such as client device 104 providing an authentication token assigned to the user.

If a user that does not have an account with system 102 and requests to create an account, the user goes through a sign up process. The sign up process may include one or more of the following: the user selecting authentication information to be used to authenticate the user, the user providing personal information, the user selecting the type of account he would like to open (e.g., a free account or a paid account that provides the user access to more storage space than a free account), and the user providing payment information. The information provided by the user during the sign up is stored in account storage 402 by authentication module 406.

Sharing module 408 processes requests from users to share content items. When a message is received from a client device 104 indicting that a user requests to share a content item included in the user's namespace, sharing module 408 stores with the item in content storage 404 an indication that the item is being shared. In one embodiment, sharing module 408 transmits to client device 104 an identifier associated with the content item that uniquely identifies the item. The identifier is to be included in a token provided by client device 104 to users with whom the item is being shared.

Management module 410 manages requests from users to add content items to namespaces and access stored items. When a content item is received from a user's client device 104 with a request to add the item to the user's namespace, management module 410 assigns a unique identifier to the content item. Management module 410 stores the content item in content storage 404 under the user's namespace along with the assigned identifier. Management module 410 transmits a confirmation message to client device 104 indicating that the content item has been stored. In one embodiment, management module 410 includes the assigned identifier in the confirmation message.

If a request is received from a requesting user's client device 104 to add a content item included in another user's namespace to the requesting user's namespace, management module 410 identifies a token included in the request. Within the token, management module 410 identifies an identifier of the content item. Management module 410 identifies the content item in content storage 404 and determines based on information stored with the item whether the item is being shared. If the item is not being shared, management module 410 denies the request. On the other hand, if the item is being shared, management module 410 adds the content item (a copy of the content item) to the requesting user's namespace in content storage 404. In one embodiment, if a password was associated with the sharing of the content item, the management module 410 requires the requesting user to provide the password.

When a request is received from a requesting user's client device 104 to access a content item stored in the user's namespace, management module 410 retrieves the item (a copy of the item) from content storage 404 and transmits the item to client device 104. When a request is received from a requesting user's client device 104 to access a content item stored in another user's namespace, management module 410 identifies the item in content storage 404 and determines whether information stored with the item indicates that the item is being shared. If it is determined that the item is not being shared, management module 410 denies the request. On the other hand, if the item is being shared, management module 410 retrieves the item (a copy of the item) from content storage 404 and transmits the item to client device 104.

Modification module 412 processes requests from client devices 104 to modify content items. When a request is received from a user's client device 104 to modify a content item included in the user's namespace in content storage 404, modification module 412 identifies the item in content storage 404. Modification module 412 identifies information included in the request indicating the modifications made to the item. Modification module 412 modifies the item in content storage 404 based on the information included in the request. The requested modification may be, for example, that the content of the item be edited or that the item be deleted from the user's namespace.

Synchronization module 414 synchronizes namespaces across systems. For each namespace in content storage 404, synchronization module 414 maintains information as to which client devices 104 include a local copy of the namespace. When a namespace in content storage 404 is modified by, for example, an item being added to the namespace or a content item in the namespace being modified, synchronization module 414 identifies client devices 104 that have a local copy of the namespace. Synchronization module 414 transmits information to each identified client device 104 indicating the modifications to the namespace and requesting that client devices 104 perform the same modifications to their local copy of the namespace.

If a local copy of a namespace is modified on a client device 104 (e.g., a user edits a local copy of a content item included in the local namespace), information is received from client device 104 indicating the modifications made to the local copy of the namespace. Synchronization module 414 performs the indicated modifications to the namespace in content storage 404. Additionally, synchronization module 414 identifies other client devices 104 that include a local copy of the namespace. Synchronization module 414 transmits information to each identified client device 104 indicating the modifications and requesting that client devices 104 performs the same modifications to their local copy of the namespace. As described above, additional description of namespace synchronization is included in U.S. Pat. No. 8,825,597.

Figure 5:
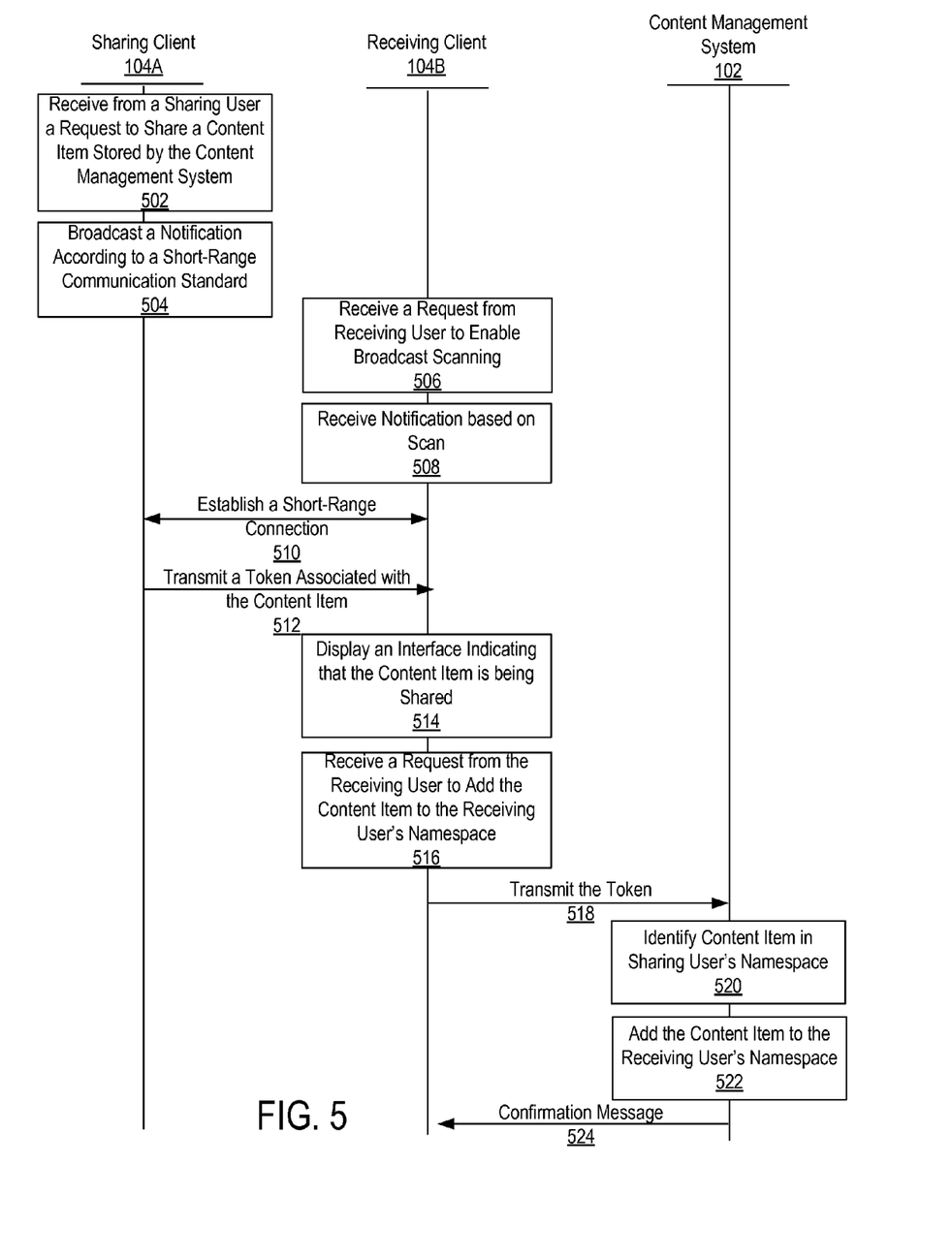
FIG. 5 is an interaction diagram of a process for sharing a content item according to one embodiment.

FIG. 5 is an interaction diagram of a process for a sharing a content item according to one embodiment. The interaction diagram illustrates the steps performed by client device 104A (may also be referred to as the sharing client) operated by a sharing user, a client device 104B (may also be referred to as the receiving client) operated by a receiving user. Those of skill in the art will recognize that other embodiments can perform the steps described below for FIG. 5 in different order. Moreover, other embodiments can include different and/or additional steps that the ones described.

Assume for purposes of this example that the sharing user and the receiving user have accounts/namespaces with content management system 102. Further, assume that receiving client 104B is within a limited broadcast range of sharing client 104A. Sharing client 104A receives 502 a request from the sharing user to share a content item stored by content management system 102 under the sharing user's namespace. Based on the request, sharing client 104A broadcasts 504 a notification with a limited broadcast range according to a short-range communication standard (e.g., Bluetooth). The notification includes an identifier of sharing client 104A. In one embodiment, sharing client 104 also notifies content management system 102 that the content item is being shared.

Receiving client 104B receives 506 a request from the receiving user to enable scanning for broadcasted notifications. Receiving user may, for example, request that scanning be enabled after the sharing user verbally notifies the receiving user that he is sharing the content item. Since receiving client 104B is within the range of the broadcast and scanning is enabled, receiving client 104B receives 508 the notification. Based on the notification, receiving client 104B and sharing client 104A establish 510 a short-range connection (e.g., a Bluetooth connection).

Sharing client 104A transmits 512 to receiving client 104B a token associated with the shared content item via the short-range connection. In one embodiment, the token includes a unique identifier of the content item. Receiving client 104 displays 514 an interface to the receiving user indicating that the content item is being shared. Receiving client 104B receives 516 a request from the receiving user to add the content item to the receiving user's namespace with content management system 102. Receiving client 104B transmits 518 the token to content management system 102 with a request for the content item to be added to the receiving user's namespace. Based on the request and the token, content management system 102 identifies 520 the content item in the sharing user's namespace. Content management system 102 adds 522 the content item to the receiving user's namespace. Content management system 102 transmits 524 a confirmation message to receiving client 104B indicating that the content item has been added to the receiving user's namespace. In one embodiment, if receiving client 104B maintains a synchronized local copy of the receiving's users namespace, the content item is provided to receiving client 104B and added by receiving client 104B to the local copy of the namespace.

Figure 6:
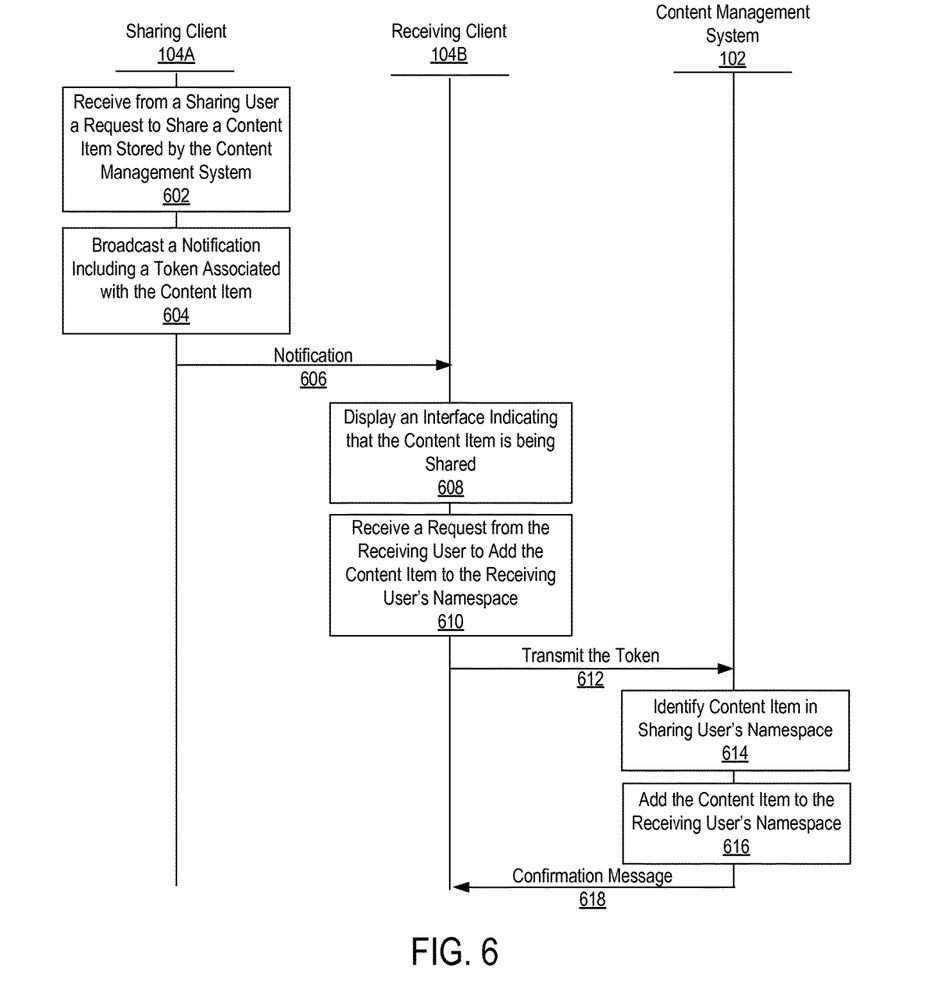
FIG. 6 is an interaction diagram of a process for sharing a content item according to another embodiment.

FIG. 6 is an interaction diagram of a process for a sharing a content item according to a different embodiment. Similar to FIG. 5, the interaction diagram illustrates the steps performed by sharing client 104A, receiving client 104B, and content management system 102. Those of skill in the art will recognize that other embodiments can perform the steps described below for FIG. 6 in different order. Moreover, other embodiments can include different and/or additional steps that the ones described.

Similar to FIG. 5, assume the sharing user and the receiving user have accounts/namespaces with content management system 102 and that receiving client 104B is within a limited broadcast range of sharing client 104A. Sharing client 104A receives 602 a request from the sharing user to share a content item stored by content management system 102 under the sharing user's namespace. Based on the request, sharing client 104A broadcasts 604 a notification with a limited range. The notification includes a token associated with the content item. In one embodiment, the token includes a unique identifier of the content item.

Receiving client device 104B receives 606 the notification based on being within the limited range of the broadcast. Hence, in this example, unlike in FIG. 5, the initial broadcasted notification includes the token associated with the content item and receiving client 104B receives the notification as long as it is within the limited range of the broadcast. The receiving user does not need to enable scanning for notifications.

Based on receipt of the notification, receiving client 104B displays 608 to receiving user an interface indicating that the content item is being shared. Receiving client 104B receives 610 a request from the receiving user to add the content item to the receiving user's name space with content management system 102. Receiving client 104B transmits 612 the token to content management system 102 with a request for the content item to be added to the receiving user's namespace. Based on the request and the token, content management system 102 identifies 614 the content item in the sharing user's namespace. Content management system 102 adds 616 the content item to the receiving user's namespace. Content management system 102 transmits 618 a confirmation message to receiving client 104B indicating that the content item has been added to the receiving user's namespace.

Additional Considerations

The foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include one or more general-purpose computing devices selectively activated or reconfigured by one or more stored computer programs. A computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Described embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   responsive to a receiving device of a receiving user being within a limited broadcast range of a sharing device, receiving, by the receiving device, a notification broadcast by the sharing device based on a sharing user requesting to share a content item, the notification broadcast by the sharing device without using contact information of the receiving device or the receiving user to broadcast, the content item stored in a first namespace with a content management system, the content management system being remote from the receiving device and the sharing device, the first namespace associated with the sharing user;
   establishing, by the receiving device, a short-range connection with the sharing device based on the received notification;
   receiving, by the receiving device from the sharing device via the short-range connection, an encrypted token comprising an encrypted identifier for the content item, the encrypted token encrypted by the sharing device based on a password provided by the sharing user to the sharing device;
   responsive to receiving the encrypted token, prompting, by the receiving device, the receiving user to provide the password;
   decrypting, by the receiving device, the encrypted token based on the password to generate a decrypted token, the decrypted token comprising an unencrypted identifier for the content item; and
   transmitting, by the receiving device to the content management system, the decrypted token and a request that the content item be added to a second namespace with the content management system, the second namespace associated with the receiving user of the receiving device, wherein the content item is accessible to the receiving device via the second namespace.

2. The method of claim 1, wherein the notification is broadcast by the sharing device according to a short-range communication standard that has the limited broadcast range for transmitted communications.

3. The method of claim 1, wherein the receiving device receives the notification responsive to the receiving user requesting to scan for broadcast notifications.

4. The method of claim 1, wherein the content item is not stored on the sharing device.

5. The method of claim 1, further comprising:
   receiving from the content management system a copy of the content item synchronized with the content item added to the second namespace; and
   storing, by the receiving device, the received copy of the content item.

6. The method of claim 5, further comprising:
   responsive to the content item added to the second namespace being modified in the second namespace, receiving, by the receiving device, information indicating modifications made to the content item; and
   modifying the stored copy of the content item based on the received information.

7. The method of claim 5, further comprising:
   responsive to the stored copy of the content item being modified, transmitting, by the receiving device to the content management system, information indicating modifications made to the stored copy, wherein the content item added to the second namespace is modified based on the transmitted information.

8. The method of claim 1, further comprising:
   receiving from the content management system confirmation that the content item has been added to the second namespace.

9. A computer-implemented method comprising:
   receiving, by the receiving device of a receiving user, a notification broadcast by a sharing device based on a sharing user requesting to share a content item and the receiving device being within a limited broadcast range of the broadcast, the notification broadcast by the sharing device without using contact information of the receiving device or the receiving user to broadcast, the content item stored in a first namespace with a content management system, the first namespace associated with the sharing user, and the notification broadcast according to a short-range communication standard having the limited broadcast range;

obtaining, by the receiving device, based on the notification an encrypted token comprising an encrypted identifier for the content item, the encrypted token encrypted based on a password provided by the sharing user to the sharing device;

responsive to obtaining the encrypted token, prompting, by the receiving device, the receiving user to provide the password;

decrypting, by the receiving device, the encrypted token based on the password to generate a decrypted token, the decrypted token comprising an unencrypted identifier for the content item; and transmitting, by the receiving device to the content management system, the decrypted token and a request that the content item be added to a second namespace with the content management system, the second namespace associated with the receiving user of the receiving device.

10. The method of claim 9, wherein the notification includes the encrypted token.

11. A computer-implemented method comprising:

receiving, by a sharing device from a sharing user, a request to share a content item stored in a first namespace with a content management system, the content management system remote from the sharing device, the first namespace associated with the sharing user;

receiving, by the sharing device from the sharing user, a password associated with the request to share the content item;

responsive to receiving the request and the password, generating, by the sharing device, an encrypted token comprising an encrypted identifier for the content item, the encrypted token encrypted based on the password;

broadcasting, by the sharing device, a notification with a limited broadcast range, the notification broadcast by the sharing device without using contact information of a receiving device or a receiving user to broadcast;

establishing, by the sharing device, a short-range connection with the receiving device of the receiving user that received the notification; and transmitting, by the sharing device to the receiving device via the short-range connection, the encrypted token, the receiving device configured to prompt the receiving user to provide the password and to decrypt the encrypted token based on the password to generate a decrypted token, the decrypted token comprising an unencrypted identifier for the content item for the content item to be added to a second namespace with the content management system, the second namespace associated with the receiving user of the receiving device.

12. The method of claim 11, wherein the notification is broadcast according to a short-range communication standard that has the limited broadcast range for transmitted communications.

13. The method of claim 11, wherein the notification is received by the receiving device based on being within the limited broadcast range of the notification.

14. The method of claim 11, wherein the content item is not stored on the sharing device.

15. A non-transitory computer-readable storage medium storing instructions that, when executed by a computing system, cause the computing system to perform operations comprising:

receiving, by a sharing device from a sharing user, a request to share a content item stored in a first namespace with a content management system, the content management system remote from the sharing device, the first namespace associated with the sharing user;

receiving, by the sharing device from the sharing user, a password associated with the request to share the content item;

responsive to receiving the request and the password, generating, by the sharing device, an encrypted token comprising an encrypted identifier for the content item, the encrypted token encrypted based on the password;

broadcasting, by the sharing device, a notification with a limited broadcast range, the notification broadcast by the sharing device without using contact information of a receiving device or a receiving user to broadcast;

establishing, by the sharing device, a short-range connection with the receiving device of the receiving user that received the notification; and transmitting, by the sharing device to the receiving device via the short-range connection, the encrypted token, the receiving device configured to prompt the receiving user to provide the password and to decrypt the encrypted token based on the password to generate a decrypted token, the decrypted token comprising an unencrypted identifier for the content item for the content item to be added to a second namespace with the content management system, the second namespace associated with the receiving user of the receiving device.

* * * * *